United States Patent [19]

Matsui

[11] 4,435,826
[45] Mar. 6, 1984

[54] FRAME SYNCHRONIZER

[75] Inventor: Yasuo Matsui, Yokosuka, Japan

[73] Assignee: Hitachi, Ltd., Tokyo, Japan

[21] Appl. No.: 297,509

[22] Filed: Aug. 28, 1981

[30] Foreign Application Priority Data

Sep. 5, 1980 [JP] Japan .................................. 55-122257

[51] Int. Cl.³ .............................................. H04L 7/08
[52] U.S. Cl. ..................................... 375/115; 370/107
[58] Field of Search ........................... 375/1, 115, 106; 370/107; 343/5 PN

[56] References Cited

U.S. PATENT DOCUMENTS

| | | | |
|---|---|---|---|
| 3,648,237 | 3/1972 | Frey, Jr. et al. | 375/115 |
| 4,079,195 | 3/1978 | Frutiger | 375/115 |
| 4,122,393 | 10/1978 | Gordy et al. | 375/115 |
| 4,152,651 | 5/1979 | Lampert et al. | 375/1 |
| 4,168,529 | 9/1979 | Tomlinson | 375/115 |
| 4,203,070 | 5/1980 | Bowles et al. | 375/115 |

Primary Examiner—Jin F. Ng
Assistant Examiner—Stephen Chin
Attorney, Agent, or Firm—Antonelli, Terry & Wands

[57] ABSTRACT

A frame synchronizer for detecting synchronizing patterns inserted at leading positions of data trains, for each data, which data trains are independent for each period, by a mechanical sensor mounted on the earth observing satellite LANDSAT is disclosed. The code synchronizer comprises a PN code generator for cyclically generating a PN code, a comparator and a counter. A receiving code train including the PN code as a synchronizing signal is applied to the PN code generator and the number of times of coincidence of the output code of the PN generator and an input code is counted. When the number of times of coincidence exceeds a preset number, it is determined that the synchronization has been obtained. A probability of wrong synchronization is minimized and the loss of image on a ground station is prevented.

6 Claims, 7 Drawing Figures

FRAME SYNCHRONIZER

The present invention relates to a frame synchronizer, and more particularly to a frame synchronizer for detecting synchronizing patterns at leading ends of data having variable period, train by train of data, in a sensor which scans the ground by an optical system having a mechanically vibrating mirror, such as in the earth observation satellite LANDSAT.

According to the present invention, there is provided a frame synchronizer comprising: a PN code generator for cyclically generating a PN code; a comparator; a counter; means for applying a receiving code train including the PN code as a synchronizing signal to the PN code generator; means for counting the number of times of continuous coincidence of the output code of the PN code generator and an input code by the counter; and means for determining success of synchronization when the number of times of coincidence exceeds a preset number.

The invention will be described by way of examples only with reference to the accompanying drawings, in which.

The earth observation satellites LANDSAT I to III of the U.S. were launched and data useful in various fields have been obtained by analyzing images of the earth surface transmitted from the satellites. The LANDSAT I to III are a series of satellites having substantially same specifications, but the LANDSAT D which is planned to be launched in 1982 has a completely new type of sensor called thematic mapper (hereinafter referred to as TM) which has a higher resolution and can provide data of more spectral bands, in addition to a multi-spectrum scanner (hereinafter referred to as MSS) which has the same specifications as the sensor of the existing series. Since the data from the TM sensor are transmitted to the ground in a completely different frame configuration than that of the existing MSS sensor, a completely new type of frame (code) synchronizer is required.

In order to facilitate the understanding of the code synchronizer of the present invention, a characteristic of the frame configuration of the TM will be explained.

Figure 1:
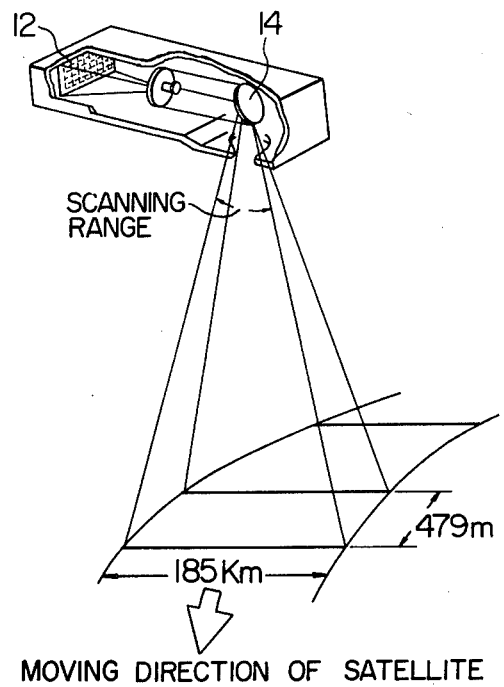
FIG. 1 shows a scanning diagram of a thematic mapper (TM) of the LANDSAT-D.
Figure 2:
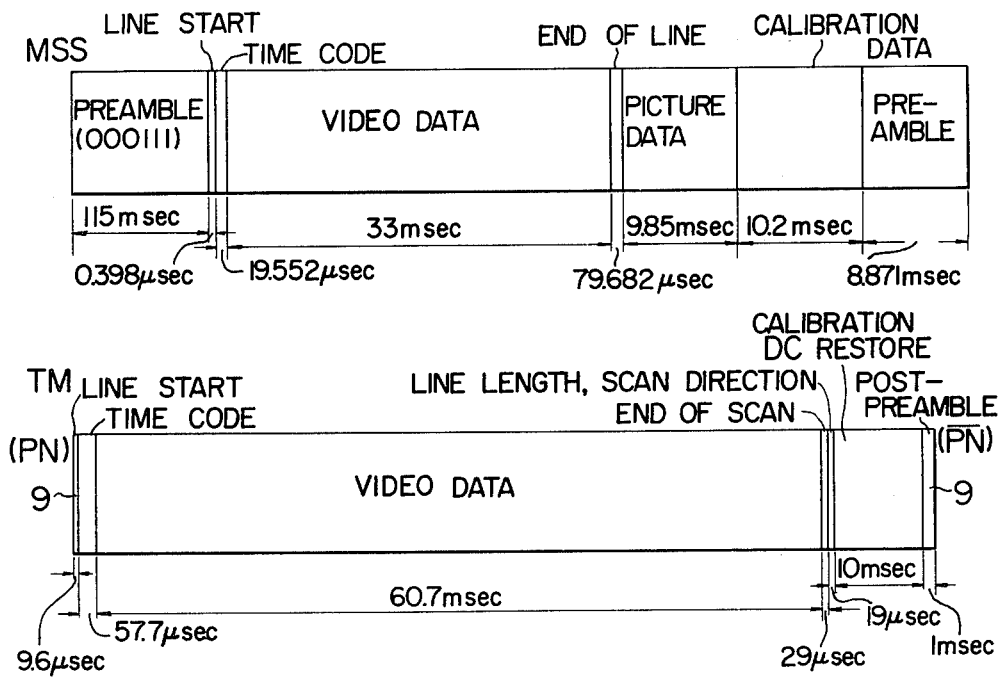
FIG. 2 shows formats of major frames of the multispectrum scanner (MSS) and the thematic mapper (TM)

Referring to FIG. 1, the TM sensor scans a reflection ability of the ground surface by a scan mirror in an east to west direction and a west to east direction alternately, and detects it by detectors. The reflection ability in a north to south direction is scanned by the movement of the satellite in a 185 km swath width. The following Table 1 shows the comparison of the TM and the MSS. As seen from the Table 1, 26-100 detectors are used and a ground resolution is 80-30 meters and a spectrum band is 5-7. Thus a performance and a function are materially enhanced. On the other hand, a bit rate is 15 Mbps–85 Mbps and a frame configuration is that shown in FIG. 2. One major frame corresponds to one scan of the scan mirror shown in FIG. 1.

TABLE 1

| Item | T M | M S S |
|---|---|---|
| Ground Resolution | 30 m | 80 m |
| Spectrum Band | 7 | 5 |
| No. of detectors | 100 | 26 |
| Video Data in 1 Major Frame | 6,320 Pixels | 3,240 Pixels |
| Bit Rate | 84.903 Mbps | 15.062 Mbps |
| 1 Major Frame | 71.462 m sec. | 73.42 m sec. |
| 1 Minor Frame | 102 words | 150 words |
| 1 word | 8 bits | 6 bits |
| Encoding | PN encoding with lower 4 bits inverted | middle two bits inverted |
| Scan Direction | West→East, East→West alternately | West→East |

Thus unlike a PCM 24B transmission system, the frame length varies for each scan because the frame length varies in accordance with the mechanical scan. Accordingly, synchronization must be given for each frame, and if the synchronization is lost, one scan of data are lost, that is, an image of 479 meters is lost, resulting in a stripe on an image screen. Thus, the requirements for the code synchronizer are:

(1) Frame synchronization is given for each frame.

(2) A probability of mis-synchronization and a probability of false synchronization are as small as possible.

Figure 3:
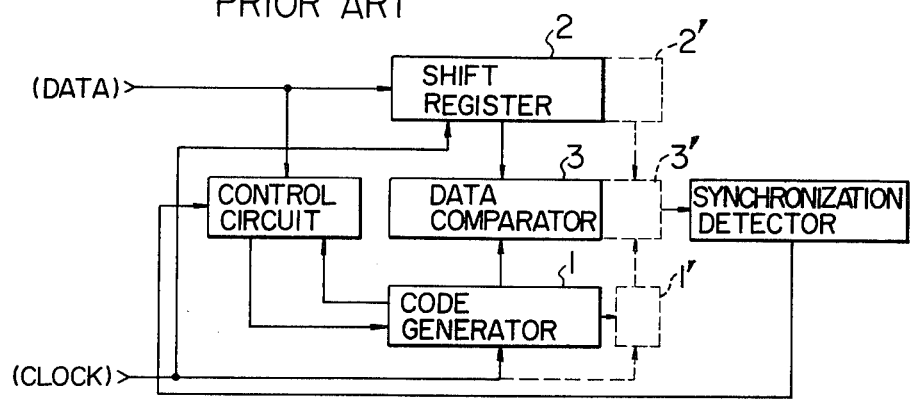
FIG. 3 shows a block diagram of a prior art code synchronizer.

As shown in FIG. 3, in the prior art synchronizer using a PN code comprises a PN code generator 1, a shift register 2 and a data comparator 3.

An input code is applied to the PN code generator 1 and the shift register 2, and the bits of the PN code generator 1 and the bits of the shift register 2 are compared in the muti-bit comparator 3 so that the synchronization is detected when the equality of all the bits is detected. As a result, the shift register 2 as well as the PN code generator 1 are needed, and when the number of bits of the PN pattern to be compared is larger than the number of bits of the PN code generator, the number of bits of the shift register 2 must be increased accordingly by an expansion field 2' and the PN code generator 1 and the data comparator 3 must also be expanded. As a result, a large hardware is required. Furthermore, since the PCM data has the PN code only in the synchronizing pattern and other major fields have different patterns, a complex control circuit is required to allow that the comparison is made only when the synchronizing pattern field is applied and the comparison is inhibited when the other codes are applied.

When a wrong synchronizing pattern is detected, a stripe produces on an image. It is desirable that the frequency of the occurrence of such wrong detection is as low as possible. In the present invention, the frequency of one time per month of operation is set as a target. A probability in this example is calculated as follows assuming that a visible time of the satellite is 20 minutes/run, data are recorded twice per day and the number of days of operation of a center is 25 days/month. The operation time per month is 20 minutes/run×60 seconds/min×2 runs/day×25 days/month=6.0×10⁴ seconds/month.

On the other hand, a length of one major frame of the TM is approximately 71.5 milliseconds in average.

Thus, the number of major frames per month transmitted from the satellite is $$\frac{6 \times 10^4}{71.5 \times 10^{-3}} = 8.4 \times 10^5$$

Accordingly, in order for the probability of failure of detection of the synchronizing pattern to be no more than one per month, the probability of failure of synchronization should be no more than $$\frac{1}{8.4 \times 10^5} \approx 1.2 \times 10^{-6}$$

The cause of the failure of the detection of the synchronizing pattern is a bit error which is caused in the course of the data transmission between the satellite and the ground or by a tape recorder used to record the data on the ground. The former is designed to be no more than $10^{-5}$ and the latter is designed to be no more than $10^{-6}$, but a first error (due to drop-out of a magnetic tape) is included and a bit error rate for the input error is no more than $10^{-3}$ in the worst case. Even in such a case, the requirement set forth above is met.

Figure 4:
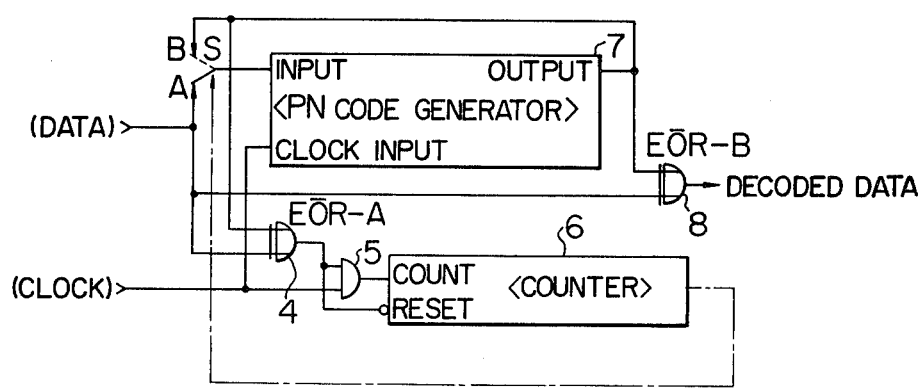
FIG. 4 shows a block diagram of one embodiment of the present invention.

An embodiment of the present invention will next be explained. FIG. 4 shows a block diagram of the embodiment of the present invention which comprises a PN code generator 7, a comparator 4, a clock gate 5, a counter 6, a switch S for selectively connecting an input of the PN code generator 7 to a data input terminal or a feedback output terminal of the PN code generator 7, and a coincidence circuit 8 for comparing the input data with an output code of the PN code generator 7. The data is applied to the input terminal of the PN code generator 7 through the switch S, and when the switch S is thrown to a broken line position the data is applied to the feedback output terminal of the PN code generator 7. The output of the PN code generator 7 and the input data are applied to the comparator 4 which produces an equal signal when both inputs are equal. The equal signal is applied to the clock gate 5 which gates the output of the comparator 4 to the counter 6 for each clock input. The counter 6 counts up the outputs of the comparator 4 and when the count reaches a preset count the counter 6 throws the switch S to the broken line position. A reset signal which is an inverted version of the output of the comparator 4 is applied to a reset terminal of the counter 6 so that the counter 6 is reset when the equal signal is not produced. The input data is also applied to the coincidence circuit 8 together with the output of the PN code generator 7. The coincidence circuit 8 produces a "1" output when the both inputs are equal, and a "0" output when the both inputs are not equal.

Figure 5:
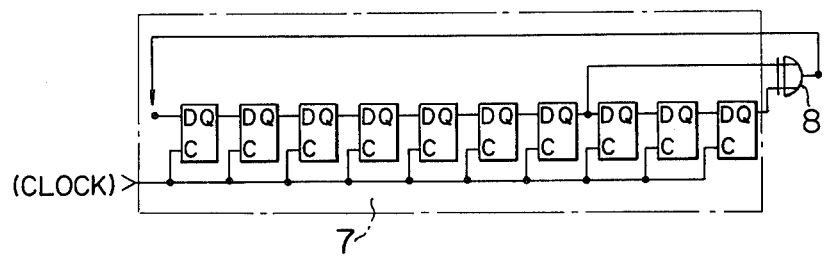
FIG. 5 shows a configuration of a PN code generator.

FIG. 5 shows a block diagram of the PN code generator 7. Respective Q-terminals of the D-type flip-flops are connected to D-terminals of the next stage flip-flops, and a common clock signal is applied to respective C-terminals of the flip-flops. The Q-terminal of the seventh flip-flop and the Q-terminal of the last (tenth) flip-flop are connected to a coincidence circuit 8, which produces a "1" output when both inputs are equal. The output signal of the coincidence circuit 8 is a feedback signal which is fed back to a D-terminal of the first flip-flop so that a ten-bit PN code is generated cyclically.

Figure 6:
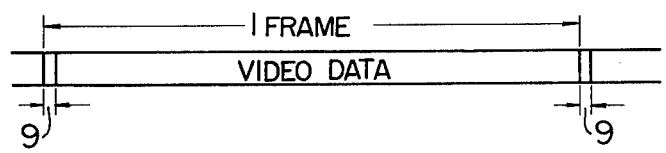
FIG. 6 shows a format of a data frame.
Figure 7:
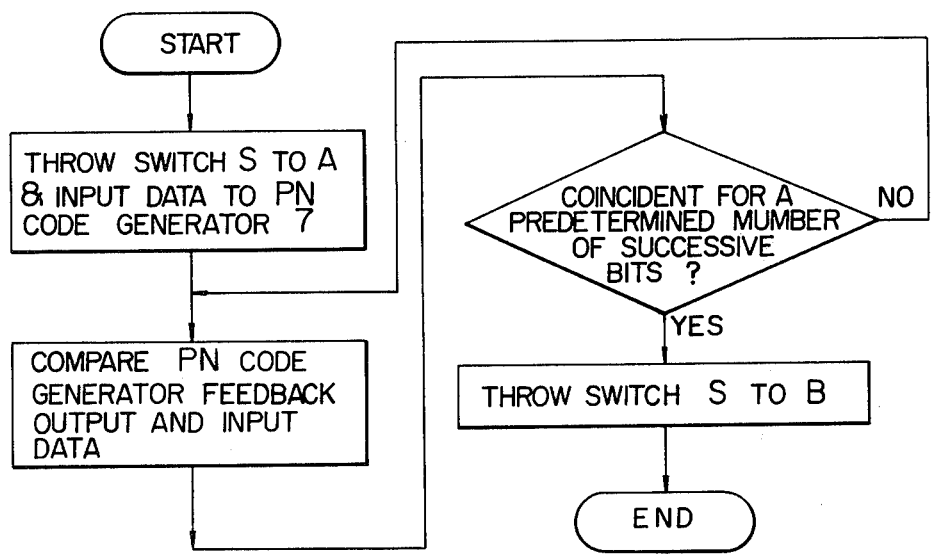
FIG. 7 shows a flow chart for explaining the operation of the embodiment shown in FIG. 4.

The operation of the present embodiment is now explained. As shown in FIG. 6, a format of data of one frame comprises a synchronizing pattern field 9 which is repetition of the PN code, followed by a data field. The data field may include data modulated with the PN code. The input code of such format is applied to the input terminal of the PN code generator 7 through the contact A of the switch S and the input data is compared with the feedback output of the PN code generator 7 by the comparator 4. Since the PN code generator generates the PN code, it is equal to the PN code inserted in the synchronizing pattern field of the input data. Accordingly, the comparator 4 supplies the equal signal to the clock gate 5 which produces the output signal for each clock signal and the counter 6 counts up the output signals. When the count reaches the present count, it is determined that the synchronization has been obtained and the switch S is thrown to the contact B. The above operation is illustrated in a flow chart of FIG. 7. The PN code generator 7 continues to cyclically generate the PN code. Since the input data follows in the synchronizing pattern field of the input data, the comparator continues to produce the equal signal during the PN code period. When the data in the data field is supplied, the output signal from the PN code generator 7 and the input data are usually not equal and the comparator 4 produces the "0" output to reset the counter 6. During the data period, a probability of continuous coincidence with the PN code is very low and even if the equal signal happens to be produced non-equal condition occurs in a short time. Thus, the counter is reset each time when the non-equal condition occurs and the count does not reach the preset count. On the other hand, the input data is compared with the output code of the PN code generator by the coincidence circuit 8 which produces the "1" output when the inputs are equal and the "0" output when the inputs are not equal. In this manner, a demodulated data is produced. When the synchronizing pattern field is applied next, the above operation is repeated so that the synchronization is obtained for each frame. Since the synchronization can be determined by the coincidence of several tens of bits, the counter 6 may be a several-bit counter. The data demodulating coincidence circuit 8 may share the synchronization detecting comparator 4. The input switch S may be a gate circuit. In accordance with the present embodiment, when the number of bits of the PN code generator is ten and the number of bits required to determine the detection is 41, the circuit may be constructed by the 10-bit PN code generator 7, one comparator 4 and the 6-bit binary counter 6. The gate circuit 5 connecting those circuits may be of simple construction. Even if an error is included in the data, the detection can be attained provided that the error bits occur at a shorter interval than that of the detecting bits. Thus, if a bit error rate is no more than $2.5 \times 10^{-2}$, the detection is attained. In the prior art device, the detection was difficult when the error is included in the data because the data is supplied to the PN code generator without check. In addition, the prior art device for effecting the synchronization detection for the above requirement needed a 41-bit shift register, a 31-bit register and a 41-bit comparator in addition to the PN code generator. The hardware of the present embodiment is much less than the prior art device.

As described above, the code synchronizer of the present invention generates the PN code by cycling the output of the PN code generator and compares the PN code with the input data and determines the synchronization when the number of times of coincidence reaches the preset count. Thus, the construction is simplified and less hardware is required.

What is claimed is:

1. A frame synchronizer comprising:
   a PN code generator having a feedback path for circulating the output of the generator therethrough to thereby generate a PN code cyclically in response to a data input to the frame synchronizer, said data input containing a PN code, said feedback path including switch means for enabling said PN code generator to alternately receive said data input and the output of said PN code generator;
   a comparator for comparing said data input and said cyclically generated PN code from said PN code generator and generating an equal signal when the PN code in said data input is identical with said cyclically generated PN code;
   a counter responsive to the output of said comparator for determining whether the time of continuation of said equal signal is as long as a predetermined time period and for generating a control signal when said equal signal is determined to continue for said predetermined time period, said switch means being responsive to said control signal from said counter for enabling said PN code generator to receive the output thereof for said cyclic generation of the PN code by said PN code generator; and
   a coincidence circuit for comparing said data input and the output of said PN code generator and for producing a decoded data when said data input and the output of said PN code generator are coincident with each other.

2. A frame synchronizer comprising:
   a PN code generator arranged to alternately receive through a switch a data input and a feedback output of the PN code generator;
   a comparator delivering an output representative of coincidence of said data input and said feedback output;
   a clocked gate for passing the output of said comparator in response to a clock signal;
   a counter for counting the coincidence output delivered through said clocked gate and providing a control signal when the count number reaches a predetermined value, said control signal being for actuating said switch; and
   a coincidence circuit for comparing the output of said PN code generator and said data input and for producing a decoded output when the output of said PN code generator and said data input are coincident with each other.

3. A frame synchronizer according to claim 2, in which said PN code generator includes a plurality of D-type flip-flop circuits in cascade connection.

4. A frame synchronizer according to claim 2, in which said counter includes a binary counter.

5. A frame synchronizer according to claim 2, in which said switch includes a gate circuit.

6. A frame synchronizer according to claim 2, in which said PN code generator is in a 10-bit structure and said counter is in a 6-bit structure.

* * * * *